March 9, 1926. 1,576,312
W. H. DINSPEL
CENTRAL STATION APPARATUS FOR PNEUMATIC DISPATCH SYSTEMS
Filed Sept. 5, 1925
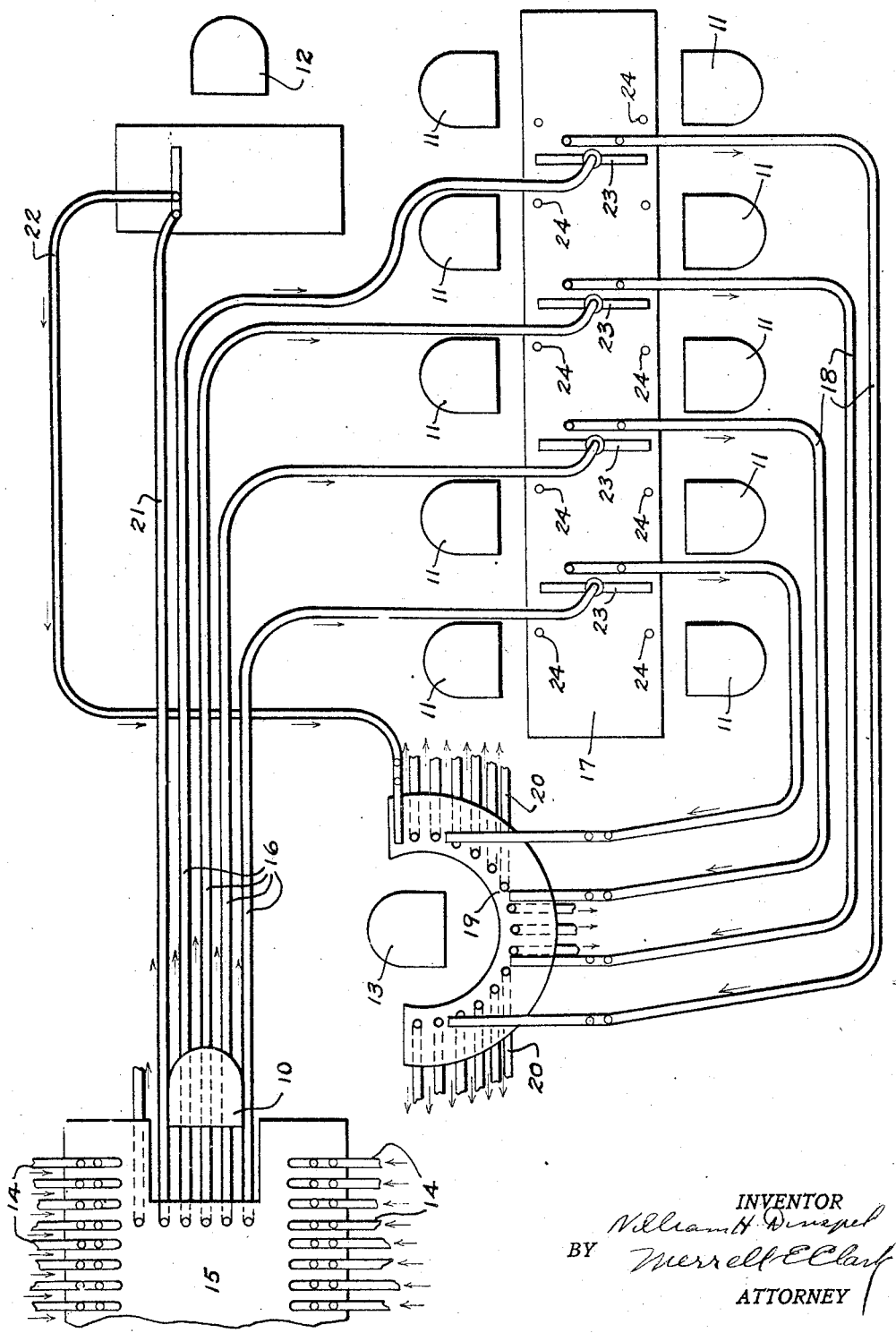
INVENTOR
William H. Dinspel
BY Merrell E. Clark
ATTORNEY Patented Mar. 9, 1926.

1,576,312

UNITED STATES PATENT OFFICE.

WILLIAM H. DINSPEL, OF NEW YORK, N. Y., ASSIGNOR TO G & G ATLAS SYSTEMS, INC., OF NEW YORK, N. Y., A CORPORATION OF NEW YORK.

CENTRAL-STATION APPARATUS FOR PNEUMATIC-DISPATCH SYSTEMS.

Application filed September 5, 1925. Serial No. 54,624.

*To all whom it may concern:*

Be it known that I, WILLIAM H. DINSPEL, a citizen of the United States, and resident of New York, in the county and State of New York, have invented certain new and useful Improvements in Central-Station Apparatus for Pneumatic-Dispatch Systems, of which the following is a specification.

This invention relates generally to a central station installation for pneumatic dispatch systems.

In pneumatic dispatch installations known in the prior art considerable difficulty has been found in providing the necessary flexibility of operation of the central station apparatus to increase or decrease the number of operators employed at the station in accordance with fluctuations in the number of carriers undergoing transmission through the system. Attempts have been made to obtain the necessary flexibility of operation through the use of belt conveyors arranged to transport arriving carriers from the discharge ends of incoming tubes along a line of operators, but this has proven objectionable and unsatisfactory because of the loss of time involved in the travel of the carriers along the belt course. The cost of operation and maintenance of the belt conveyor, which permitted no reduction even when the number of carriers being dispatched had fallen to only a small fraction of the capacity of the dispatching system, and also the difficulty of fixing responsibility for the treatment of any given carrier by an individual operator, were objectional features of the prior systems.

A general object of the present invention is to provide a carrier distributor installation which will be free from the objectionable features referred to and which will provide for the selective distribution and delivery of carriers to the individual operators, through the control exercised by a supervisory or relay operator familiar with the conditions of the work in general and, in particular, aware of the condition of the work at the operators' stations.

Another object of the invention is to provide for the immediate release or recall of operators in accordance with the needs of the work, and the immediate accommodation of the apparatus to such changes in the operating force as may be found necessary to fit the fluctuating demands of the service.

The invention consists of a central disk installation including a receiving station at which carriers are delivered from all parts of the system, and from which a supervisory operator relays or re-dispatches the carriers through distributing tubes leading to adjacently located cashiers' or operators' stations. The cashiers, when change has been made and the operations otherwise completed, place the carriers in tubes for transit and delivery to an adjacent main dispatching station from which the operator in charge dispatches the carriers to the outlying stations from which they were originally sent to the receiving or relay station.

A feature of the invention resides in the adaptation of each of the tubes leading from the relay station to the cashiers' stations to distribute or deliver carriers to two or more operators having stations located adjacent the delivery end of the tube, each station being equipped with a control device for causing a carrier to be discharged from the tube delivery terminal to the respective station as required by the operator.

Another feature of the invention resides in a compact or relatively closely associated arrangement of the relay, the cashiers', and the dispatchers' stations, such that the relay operator can exercise a close supervision over the work of the cashiers and distribute the carriers or vary the number of operators in accordance with the immediate demands of the work.

Other features of the invention will be hereinafter referred to.

In the drawings a single view in diagrammatic form illustrates a preferred embodiment of the invention.

Referring to the drawing for a more detailed description of the invention, the single figure chosen for illustration of the invention is a planned view in diagrammatic form of a central station apparatus for pneumatic dispatch systems. The central station apparatus shown includes a receiving or relay station 10, cashier's or operator's station 11, a credit authorizer's station 12, and dispatcher's station 13.

At the receiver's station 10, the discharge terminals of two banks 14 of incoming pneumatic tubes are arranged to discharge incoming carriers into a receptacle or hopper 15 convenient to an operator seated at the station. A group of dispatch tubes 16 leads from the relay station 10 to the cashiers' stations 11 already referred to. Preferably the cashiers' stations 11 are arranged along opposite sides of an elongated table 17 above the central portion of which the discharge terminals of the dispatch tube 16 are located for the convenient distribution of the carriers dispatched thereto to the cashiers' stations located at the opposite sides of the table 17.

From the construction described, it will be seen that carriers arriving at the receiving or relay station 10 from the outlying stations, such as customers' stations in a department store, are relayed by the operator at station 10 to the cashiers' stations 11. The stations 11 are located sufficiently close to the station 10 for the operator at station 10 to observe the progress of the work at the cashiers' stations, thereby distributing the dispatch carriers to the best advantage. It will be seen also that each one of the relay dispatch tubes 16 serves or delivers to more than one operator's station 11. When the carriers arriving at the cashiers' stations 11 have been treated they are then dispatched through a group of dispatch tubes 18 to the receiving receptacle or hopper 19 of the dispatcher's station 13 which has been heretofore referred to. The operator at the station returns the treated carriers through the dispatch tube 20 to the outlying stations from which the carriers were originally dispatched to the relay station 10. This completes the cycle of operations and it will be seen that the elapsed time between the arrival of a carrier in the relay station 10 of the central apparatus and its dispatch from the dispatcher's station 13 can be made very brief. This is brought about by the relatively compact arrangement of the various operating stations as a whole and the close cooperation and corelation that can exist between the various operators. The relay operators at station 10 are in a position to selectively dispatch carriers to the cashier's or operator's station 11 in strict conformity with the speed at which the operators at these stations are working, with the result that a minimum waste of time takes place.

In addition, fluctuations in the volume of carriers dispatched can be quickly made in the central station by the addition or withdrawal of operators from the stations 11 thereby providing any desired flexibility of adaptation to the conditions of the work. A further advantage obtained by the system described is in the saving of power at the stations from which operators are temporarily withdrawn. The range of flexibility in the number of operators employed is very great and may expand between the maximum number of operators required to fill the stations and a single operator. Even this limit may be exceeded and, with a very low volume of work, the arriving carriers may be teated at the receiving station 10, the treated carriers being handed or tossed directly from the station to the receiving receptacle 19 of the dispatch station 13 for return dispatch to the outlying stations. Thus the range of flexibility of the central station apparatus described will be seen to be very great.

In addition to the cashiers' stations 11 at which change is made and returned to the outlying stations, a credit authorizer's station 12 is provided, where carriers containing charge or credit slips are examined upon receipt at this station of such carriers through a dispatch tube 21. Leading from the relay station 10 a special return tube 22 is provided through which the treated carrier is returned from the credit authorizer's station 12 to the dispatcher's station 13 for return dispatch to the original outlying station from which the carrier was dispatched to the relay station 10.

Referring again to the cashier's station equipment, the delivery terminals of the dispatch tubes 16 through which carriers are transmitted from the relay station 10 are provided with two-way delivery members 23 by which carriers can be delivered to a cashier at either side of the table 17 as may be desired. Preferably, various devices 24 are provided by which cashiers at the individual stations may themselves control delivery of carriers to their respective stations. Details of the distributing of delivering devices referred to are embodied in a companion application Serial #54,943 filed Sept. 8, 1925, in which this apparatus is described and claimed.

What is claimed is:—

1. In a central station installation for pneumatic dispatch systems, a relay station at which carriers are received from outlying stations, a plurality of operators' stations to which carriers are dispatched by an operator at the relay station, and a dispatching station to which carriers are transmitted by the operators for return dispatch to the outlying stations from which they were received by the relay station.

2. In a central station installation for penumatic dispatch systems, a relay station at which carriers are received from outlying stations, a plurality of cashiers' stations to which carriers are dispatched by an operator at the relay station, a credit authorizer's station to which carriers are dispatched by said operator at the relay station, and a dispatcher's station to which carriers are transmitted by the operators and by the credit authorizer for return dispatch to the outlying stations from which they were received by the relay station.

3. In a central station installation for pneumatic dispatch systems, a relay station at which carriers are received from outlying stations, a plurality of operators' stations, a plurality of dispatch tubes less in number than the number of operators' stations connecting the relay station with the operators' stations and through which carriers are selectively dispatched to the operators' stations by the operator at the relay station, and a dispatcher's station to which carriers are transmitted by the operators for return dispatch to the outlying stations from which they were received at the relay station.

4. In a central station installation for pneumatic dispatch systems, a relay station at which carriers are received from outlying stations, a plurality of operators' stations, a plurality of dispatch tubes through which carriers are dispatched by the operator at the relay station to the operators' stations, each of said dispatch tubes being arranged to deliver carriers to a plurality of operators, and a dispatcher's station to which treated carriers are dispatched by the operators for return dispatch to the outlying stations from which they were received at the relay station.

5. In a central station installation for pneumatic dispatch systems, a relay station at which carriers are received from outlying stations, an operator's table, stations for operators on opposite sides of the table, a plurality of dispatch tubes leading from the relay station to the operator's table, each tube being arranged to deliver carriers for a plurality of operators stationed at opposite sides of the table, and a dispatcher's station to which treated carriers are transmitted by the operators for return dispatch to the outlying stations from which they were received at the relay station.

6. In a central station installation for pneumatic dispatch systems, a relay station, a plurality of incoming pneumatic dispatch tubes communicating with outlying stations and having their delivery ends arranged to discharge carriers at the relay station, a plurality of operators' stations, dispatch tubes through which carriers may be transmitted by the operator at the relay station to the operators' stations, a dispatcher's station, outgoing dispatch tubes connecting the dispatcher's station with the outlying stations, and tubes connecting the operators' stations with the dispatcher's station, whereby treated carriers may be transmitted by the operators to the dispatcher's station for return dispatch to the outlying stations from which they were received at the relay station.

7. In a central station installation for pneumatic dispatch systems, a relay station at which carriers are received from outlying stations, a plurality of cashiers' stations, a plurality of operators' stations, a plurality of dispatch tubes through which carriers are dispatched by the operator at the relay station to the operators' stations, each of said dispatch tubes being arranged to deliver carriers to a plurality of operators, a credit authorizer's station to which carriers are dispatched by said operator at the relay station, and a dispatcher's station to which carriers are transmitted by the operators and by the credit authorizer for return dispatch to the outlying stations from which they were received at the relay station.

8. In a central station installation for pneumatic dispatch systems, a relay station at which carriers are received from outlying stations, an operator's table, stations for operators at opposite sides of the table, a plurality of dispatch tubes leading from the relay station to the operator's table each tube being arranged to deliver carriers for a plurality of operators at opposite sides of the table, a credit authorizer's station to which carriers are dispatched by said operator at the relay station, and a dispatcher's station to which carriers are transmitted by the operators and by the credit authorizer for return dispatch to the outlying station from which they were received at the relay station.

9. In a central station installation for pneumatic dispatch systems, a relay station at which carriers are dispatched by an operator at the relay station, a plurality of operators' stations to which carriers are selectively dispatched by an operator at the relay station, and a dispatcher's station to which treated carriers are transmitted by the operators for return dispatch to the outlying stations from which they were received by the relay station, said operators' stations being located adjacent said relay station whereby to assist the operator at the relay station in the distribution of carriers to the operators' stations.

Signed at New York, in the county and State of New York, this 17th day of August, 1925.

WILLIAM H. DINSPEL.